United States Patent [19]  [11] 4,393,943
Andersson  [45] Jul. 19, 1983

[54] TELESCOPING CARRIER FOR FORESTRY EQUIPMENT

[75] Inventor: Albert Andersson, Skellefteå, Sweden

[73] Assignee: Stiftelsen Industriellt Utvecklingscentrum, Skellefteå, Sweden

[21] Appl. No.: 13,616

[22] Filed: Feb. 21, 1979

[30] Foreign Application Priority Data

Feb. 21, 1978 [SE] Sweden ............................. 78019908

[51] Int. Cl.³ ............................................ A01B 61/04
[52] U.S. Cl. ................................. 172/260.5; 172/680; 180/14.5; 280/449; 280/656
[58] Field of Search ............... 172/261, 265, 292, 705, 172/7, 260.5, 680; 280/449, 638, 656, 425 A, 446 R; 180/14 D, 14.5; 188/279, 313; 91/437, 390, 433

[56] References Cited

U.S. PATENT DOCUMENTS

| 1,855,513 | 4/1932 | Bulkley | 280/449 |
| 2,311,826 | 2/1943 | Grasswick | 180/14.5 |
| 2,771,306 | 11/1956 | Ash | 172/680 X |
| 3,195,668 | 7/1965 | Hansen | 180/14.5 |
| 3,472,127 | 10/1969 | Scheidt | 91/437 |
| 3,670,822 | 6/1972 | Reinhardt | 172/7 |
| 3,764,166 | 10/1973 | Fiala | 280/425 A |
| 3,924,689 | 12/1975 | Manor | 172/261 X |
| 4,102,402 | 7/1978 | Steinberg | 172/265 X |

FOREIGN PATENT DOCUMENTS

| 1964708 | 12/1970 | Fed. Rep. of Germany | 180/14 D |
| 1234215 | 5/1960 | France | 180/14.5 |
| 7704892 | 11/1978 | Netherlands | 172/261 |
| 568928 | 4/1945 | United Kingdom | 180/14.5 |
| 687341 | 2/1953 | United Kingdom | 180/14.5 |
| 1151396 | 5/1969 | United Kingdom | 91/433 |
| 575236 | 10/1977 | U.S.S.R. | 280/638 |

Primary Examiner—Richard T. Stouffer
Attorney, Agent, or Firm—Sherman & Shalloway

[57] ABSTRACT

A forestry cultivation instrument, particularly a scarifier, is attached to a telescoping carrier. In operation, the carrier is connected to a vehicle and, when an obstacle is encountered, the carrier may telescope outwardly thereby reducing shock loading to both the vehicle and the scarifier. The telescoping members are held contracted by fluid pressure with the telescoping occurring, after the obstacle is encountered, when the obstacle causes fluid pressure to increase beyond the pressure which would occur from normal drawing resistance of the scarifier. The fluid pressure may then be used to aid the operator in clearing the scarifier from the obstacle. Various other forms of forestry equipment may be substituted for the scarifier.

13 Claims, 5 Drawing Figures

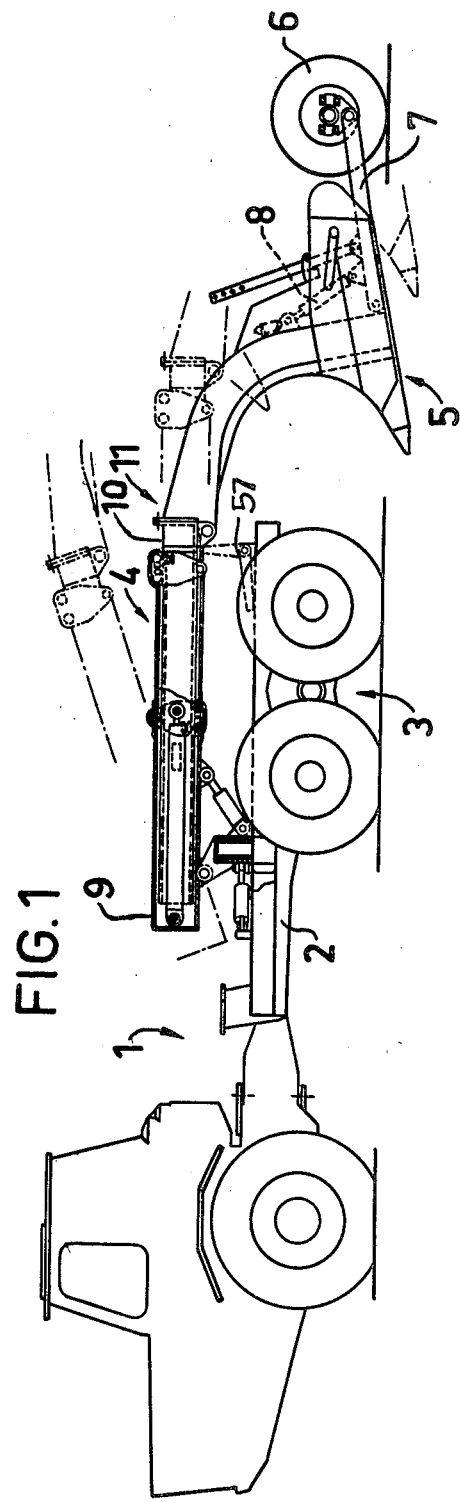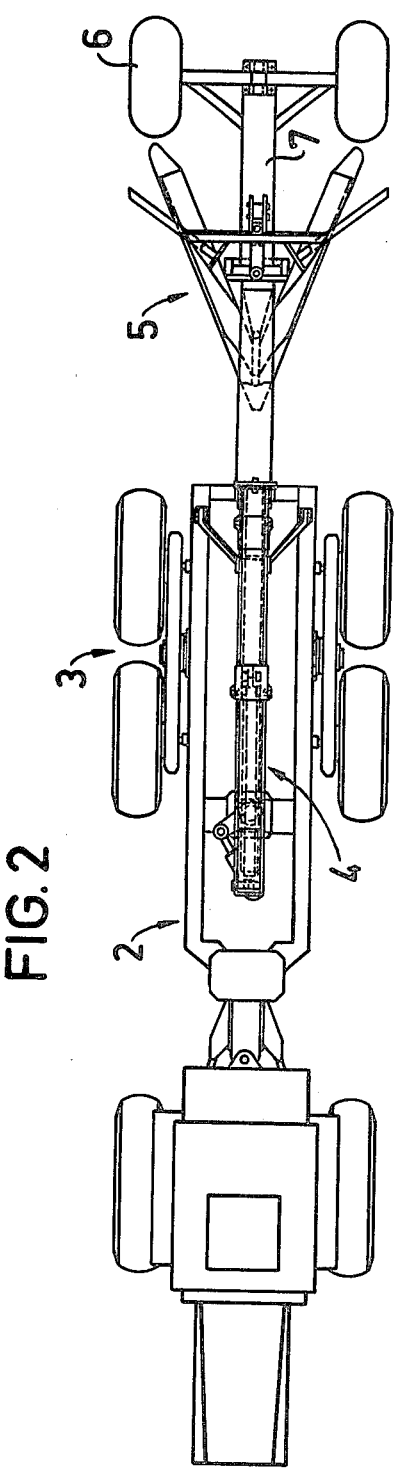

TELESCOPING CARRIER FOR FORESTRY EQUIPMENT

BACKGROUND OF THE INVENTION

This invention relates to a vehicle-supported carrier for forestry equipment, for example scarifiers and planting or seed production units comprising a rod, which at one end is provided with means for detachably attaching such an equipment, and which is connected to the vehicle chassis in at least one point between its ends.

In forestry, implements in the form of plows, rotary cultivators, harrows etc. are used, which are drawn on the ground by a vehicle of cross-country mobility, which serves as drawing machine and to which the implement substantially rigidly is connected, and which implements scarify the ground, for example, for planting and seed production. During its advancing movement, such implement (especially the plow) very often meets obstacle in the earth in the form of stones and the like, which cannot especially be moved. Due to the fact that the implement is connected rigidly in the drawing direction to the drawing machine, not only the implement but also the drawing machine and its driver are subjected to sudden and violent stresses, which unavoidably result in damages, the repair of which implies high costs, and owing to which the machines heretofore used for scarifying and the like often are out of operation for varying downtime periods. This implies low efficiency, poor profitability.

SUMMARY OF THE INVENTION

The present invention, therefore, has the object to overcome the aforesaid disadvantages and to produce a device of such a nature, that it to the greatest possible extent eliminates the damages, to the drawing machine and/or implement which occur when the implement strikes against an obstacle in the earth, and which simultaneously protects the driver of the drawing machine and renders tolerable working conditions for him by absorbing stresses, so that neither the drawing machine, the implement nor the driver are exposed to them. In addition, also other advantages are gained by the present invention, as will become apparent from the following description.

BRIEF DESCRIPTION OF THE DRAWINGS

FIGS. 1 and 2 are a lateral view, partially in section, and, respectively, a view from above of a drawing machine provided with a carrier according to the invention coupled to a plow.

Figure 3:
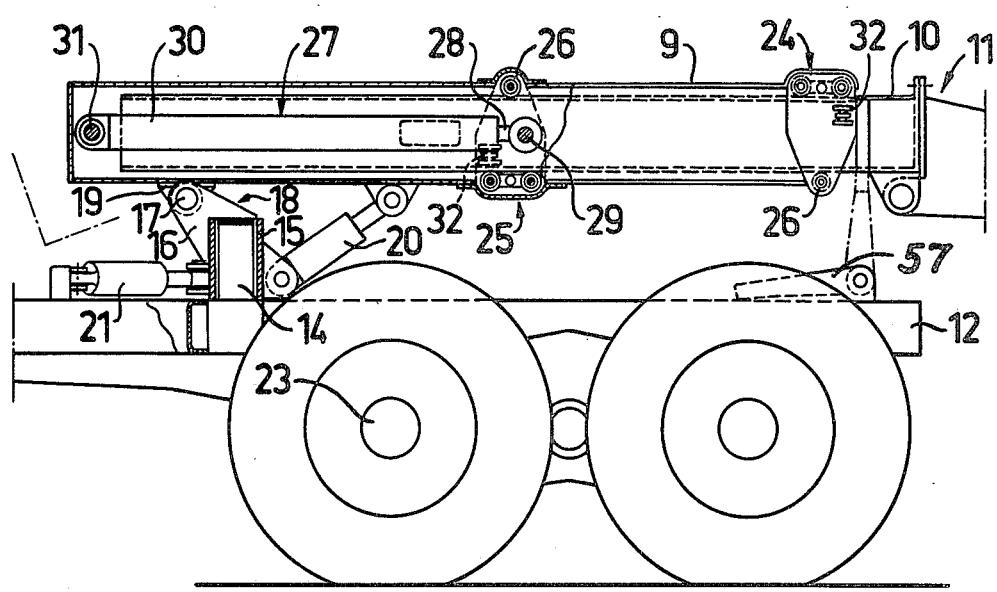
FIG. 3 is a lateral view on an enlarged scale, partially in section, of the carrier according to FIGS. 1 and 2.

In the drawings, a vehicle of cross-country mobility serving as drawing machine is generally designated by 1. It has articulated frame steering and is provided with a trailer 2 on a bogie 3 with driven wheels. On said trailer a carrier 4 according to the invention is mounted, to which is shown connected by way of example a scarifier in the form of a well known deep cultivator 5, at the rear of which wheels 6 running on the ground are located which are supported on a supporting arm 7 pivotally mounted in the frame proper of the deep cultivator and capable of being swung relative thereto by means of a piston-cylinder device 8 for adjusting the depth of the cultivator.

Figure 4:
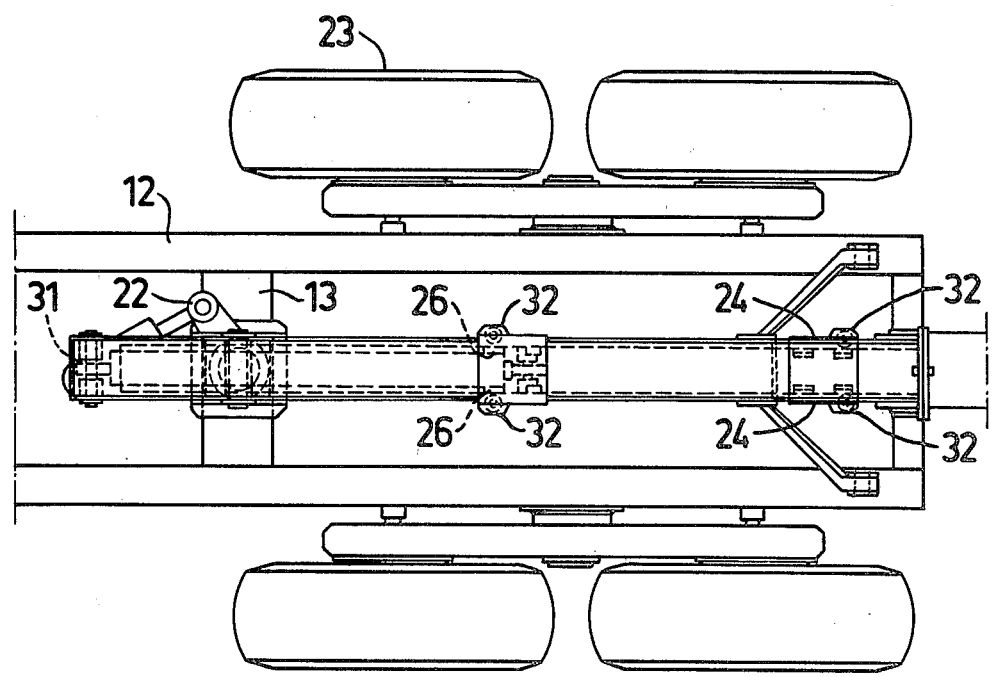
FIG. 4 shows the same carrier from above.

Referring to FIGS. 3 and 4, as well as FIGS. 1 and 2, the carrier 4 according to the invention comprises two tubular members 9,10 with circular, square, rectangular or other polygonal cross-sectional shape, which members 9,10 are telescopically movable relative one another. In the drawings, forward carrier member 9 is connected to the cultivator 5 by a fastening means 11 and is shown movably mounted within second or movable carrier member 10, which in turn is connected to the frame 12 of the trailer, more precisely to a transverse frame beam 13 of said frame. This connection between the trailer 2 and the carrier 4 comprises a stud 14 rigidly connected to the frame beam 13 and a sleeve 15 rotatably mounted on said stud, which sleeve is secured against movement in its longitudinal direction and provided with a holder 18, which consists of one or more brackets 16 and supports a shaft 17. This shaft 17 supported by the holder 18 also is supported in fastening lugs 19 or the like connected to the forward or stationary carrier member 9 and the shaft 17 extends substantially perpendicularly to the longitudinal direction of the carrier 4. By this connection, the carrier 4 can pivot both about the shaft 17 and about the stud 14, i.e. in two planes substantially perpendicular to each other. For pivoting the carrier 4 about the shaft 17, a piston-cylinder device 20 is hingedly connected between the bearing sleeve 15 and the first carrier member 9, and for pivoting the carrier 4 about the stud 14 a piston-cylinder device 21 is provided which acts between the frame 12 and a lug 22 rigidly connected to the bearing sleeve 15 and constituting a torque arm. The carrier 4 further should be supported at such a distance from the frame 12, that it can swing from the position shown in FIGS. 1 and 2 which is substantially in parallel with the frame at least through 15° in a downward direction and at least through 25° in upward direction about the shaft 17. The connection between the carrier 4 and the trailer 2 further shall be located ahead of the forward wheel axles 23 of the bogie 3 in its drawing direction, whereby an advantage is gained in that the ground pressure of the drawing machine increases with increasing drawing resistance, which in turn brings about a higher ground pressure and thereby a better and safer tractability.

Referring to FIGS. 3 and 4, the movable carrier member 10 is mounted movably within the forward carrier member 9 by means of support rollers 24,25,26 in said forward member 9 and connected thereto by a double-acting piston-cylinder device 27, the piston rod 28 of which is hingedly connected about a stud 29 mounted in the movable carrier member 10, and the cylinder 30 of which is hingedly connected to the forward portion of the forward carrier member 9 about a shaft 31 mounted therein. By means of said piston-cylinder device 27, thus, the movable carrier member 10 can be moved relative to the forward member 9 through a predetermined distance and be guided by the support rollers 24,25,26, of which the rollers 24 and 25 are arranged in pairs or as bogie wheels at a distance from each other adjusted to said predetermined distance, and the support rollers 24 located at the rear or open end of the forward member 9 shall be positioned on the upper surface of the movable member 10, while the support rollers 25 located at said distance from the rollers 24 shall be positioned on the lower surface of the movable member 10 for taking up the possibly arising bending stresses and moments. Directly in front of the support rollers 24 and 25 the support rollers 26 are located, and guide rollers 32 may be provided to the side of the movable member 10 for guiding it in lateral direction.

Figure 5:
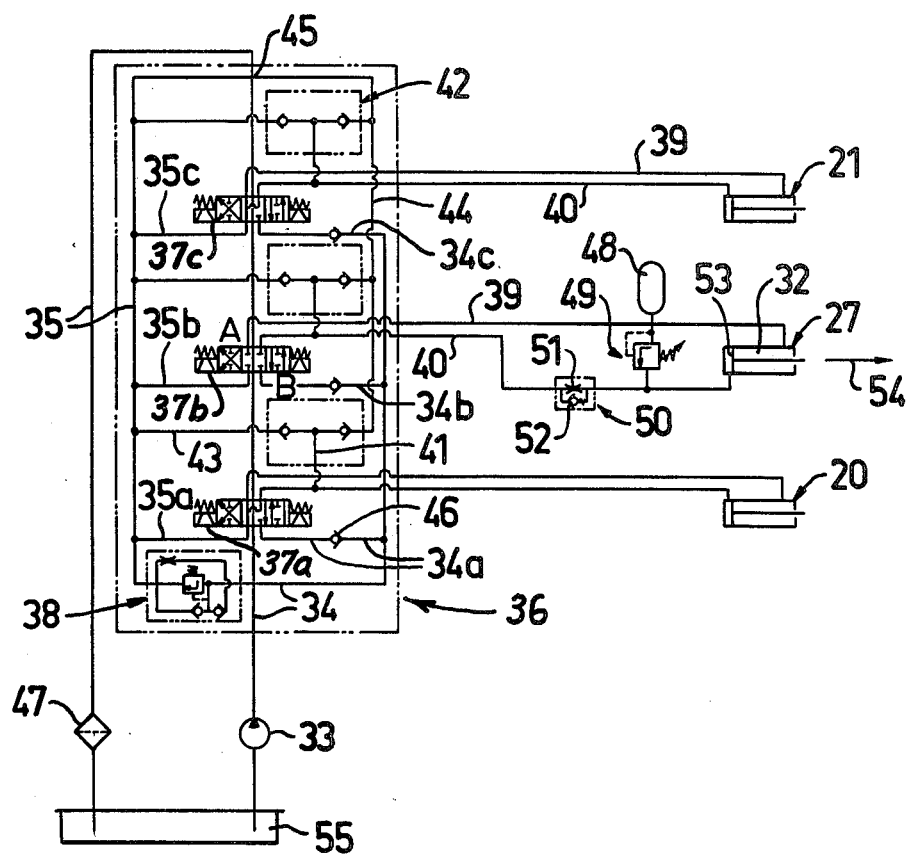
FIG. 5 is a wiring diagram for all functions of the carrier shown in the drawings.

The piston-cylinder device 27 is capable when the vehicle is driving of operating with a predetermined pressure acting to draw the piston rod 28 and the cylinder 30 together so as to counteract normal drawing resistance. The pressure is adapted to a normal drawing resistance of the implement 5 and shall be such that the movable member 10 of the carrier 4 normally is held stopped relative to the forward member 9 in the position intended, for example in its inserted position shown in FIGS. 1 and 2 while the vehicle is driving. However when the drawing resistance caused by the implement exceeds the predetermined pressure, the movable member 10 of the carrier 4 shall be permitted to move outwardly away from the forward member 9. As appears from the hydraulic wiring diagram shown in FIG. 5, said pressure is brought about by means of a pump 33, which via a pressure and return conduit 34 and 35, respectively, is connected to a valve unit 36 which comprises direction valves corresponding in number to the number of desired functions. Said direction valves 37 are so interconnected as to operate independently of each other. The valve unit further comprises a relief valve 38, which is set to said predetermined pressure and connected to the pressure conduit 34 before the direction valves 37 and to the return conduit 35. In the embodiment shown, three direction valves are provided, viz. one 37a for the piston-cylinder device 20 to pivot the carrier about shaft 17, one 37b for the piston-cylinder device 27, and one 37c for the piston-cylinder device 21 for pivoting carrier 4 about the stud 14. Said valves communicate with the pressure and return conduits 34 and 35 via the inlet conduits 34 a-c and the outlet conduits 35 a-c, of which each inlet conduit 34 a-c includes a check valve 46. Each such piston-cylinder device 20,21,27 is connected by supply and discharge conduits 39 and 40 respectively, to the respective direction valve 37, and each discharge conduit 40 is connected between the piston-cylinder device and the direction valve 37 through a conduit 41 to a suction-pressure valve 42, which valves 42 communicate each through a conduit 43 with the return conduit 35 and through a common conduit 44 with the return conduit 35 in the branching point 45. The suction/pressure valves 42 can be replaced, if so desired, by relief valves of the same type as the relief valve 38 of the valve unit. The hydraulic circuit also comprises a hydraulic oil tank 55, into which the return conduit 35 opens via a filter 47.

Differently from the piston-cylinder devices 20 and 21, the piston-cylinder device 27 comprises in its supply and discharge conduits 39, 40, an accumulator 48 coupled to the supply conduit 39, a relief valve 49 located between the supply and the discharge conduits 39, 40 and set to a higher pressure than the relief valve 38 of the valve unit, and a throttle check valve 50 located in the discharge conduit with a throttle member 51 for throttling the flow from the piston-cylinder device 27, and an associated check valve 52, which permits flow to the piston-cylinder device 27 in the discharge conduit from either the suction/pressure valve 42 or direction valve 37b.

The predetermined pressure normally to prevail in the cylinder space 32 of the piston-cylinder device 27 at the driving of the vehicle, for example in scarification operations with the deep cultivator shown in the drawings, is produced by means of the pump 33, which via the pressure conduits 34,34b, the direction valve 37b set with section A in the position intended, and the supply conduit 39 provides oil to the cylinder space 32, whereby the piston 53 together with the movable member 10 of the carrier is moved to its fully inserted position and thereby forces possible return oil from the other side of the piston back to the tank 55 via the discharge conduit 40, the direction valve 37b and the return conduits 35b and 35. When, the predetermined pressure has thus been obtained, the relief valve 38 is opened whereby oil is pumped back to the tank via the return conduit 35, and the direction valve 37b closes the connection between the pressure conduit 34 and piston-cylinder device 27. When the drawing resistance increases and exceeds the predetermined pressure, the piston 53 is moved slightly in the direction indicated by the arrow 54 in FIG. 5 and thereby brings about a pressure increase in the cylinder space 32, which pressure is taken up by the accumulator 48 if the pressure does not exceed the pressure to which the relief valve 49 is set. When the piston 53 moves in said direction 54, a vacuum arises on the opposite side of the piston which is compensated for by supply of oil via the suction/pressure valve 42. When the drawing resistance again decreases, the piston 53 returns to its bottom position, but when on the other hand the drawing resistance increases additionally so that the pressure in the cylinder space 32 exceeds the pressure set by the relief valve 49, this valve is opened and oil can flow in behind the piston 53 with the necessary addition from the suction/pressure valve 42 to compensate for the difference in volume resulting from the displacement of the piston rod. The piston 53, or more correctly the cylinder 30 hereby moves relative to the piston 28, whereby a relative movement between both members 9, 10 of the carrier 4 is obtained, so that the increase in load arising when, for example, the deep cultivator 5 meets an obstacle in the earth, is taken up by the oil due to the dynamic properties of the system, and particularly the relief valve 38, and is not transferred to the drawing machine 1, which like the implement 5 and the driver thereby are protected against sudden jerks and strokes, which otherwise would give rise to damages to the driver the drawing machine and implement. During said relative movement between both members 9,10 of the carrier, the driver can stop the machine and then by means of piston-cylinder devices 20,21 lift and/or swing aside the implement enough so that it does not contact the obstacle. This can take place also during the driving of the machine when the obstacle is discovered in time. By coupling the section B of the direction valve it also is possible to extend the carrier 4, if necessary. Hereby the oil from the pressure conduit 34 flows to the piston-cylinder device 27 via the discharge conduit 40, so that the piston rod 28 and the movable member 10 of the carrier 4 are moved out in the direction of rear wheels 6, indicated by the arrow 54 in FIG. 5. The return oil from the cylinder space 32 thereby is forced back to the return conduit via the supply conduit 39 and the direction valve 37b.

In FIGS. 1 and 3, a support 57 is shown which is located at the rear portion of the trailer 2 and can from a position indicated by fully drawn lines, in which position the support is folded down against the frame 12, be folded up to the position indicated by dash-dotted lines, in which position the support shall be during the transport in order to act as a transport support for the carrier.

When the carrier is used as drawing rod, for example for the implement shown in the drawings, the support shall be folded down against the frame, and at the same time the piston-cylinder devices 20 and 21 shall be held in floating position whereby the carrier or drawing rod are permitted to move freely to a certain extent both about the shaft 17 and the stud 14 and to assume a suitable position depending on the ground conditions. When the carrier 4 is used purely as a carrier and supports an implement which does not rest against the ground, at least piston-cylinder device 20 must be connected to hold the carrier in the position intended.

By the present invention a dynamic carrier or drawing rod has been obtained, which protects the drawing machine, the implement and also the driver, which provides the machine with better accessibility and higher capacity due to its dynamic properties, which renders possible rapid lifting and/or swinging aside the implement past damaging obstacles in or on the ground, which permits control of the distance between the drawing machine and the implement, and which brings about a higher ground pressure with resulting higher drawing resistance and improved accessibility.

The invention is not restricted to what is described above and shown in the drawings, but can be varied, modified and completed in many different ways within the scope of the invention idea defined in the attached claims. The fastening means 11, for example, comprising a stud and bolt connection can be replaced by any other fastening means suitable for this purpose.

What I claim is:

1. A vehicle-supported carrier and vehicle combination for forestry equipment comprising:
   (a) a stationary elongate member, the stationary member being provided with a connection means and being connected to a frame of the vehicle at at least one point by the connection means;
   (b) a movable elongate member, the movable member being adapted to telescopically move in relation to the stationary member, and the movable member having an attachment means for attaching an implement;
   (c) a hydraulic double acting piston-cylinder device connecting the stationary and movable member;
   (d) a horizontal axle mounted perpendicular to the direction that the members telescope, the horizontal axle being a part of said connection means;
   (e) a vertical axle located forward of all rear wheels of the vehicle, the vertical axle being a part of said connection means;
   (f) second and third piston-cylinder devices, the second and third piston-cylinder devices being operative to rotate the carrier about said horizontal and vertical axles, respectively;
   (g) a hydraulic control circuit comprising directional control valves for each piston-cylinder device and a relief valve permitting release or fluid pressure above a predetermined value, the relief valve being located in the hydraulic control circuit so as to permit the telescoping members to extend when the predetermined value is reached, so that the predetermined pressure may be set to allow controlled extension of the members when the implement encounters an obstruction, the directional control valves permitting retraction when the obstruction is overcome and the directional control valves can be used by an operator to control the extension of the carrier and the rotation of the carrier about said axles in the connection means;
   (h) guide means including guide wheels for guiding the members in relation to one another when the members are being telescopically extended and contracted.

2. A carrier adapted to be supported on a vehicle, one end of the carrier being provided with means for detachably attaching an implement for forestry cultivation, and the carrier being capable of being connected to the vehicle at at least one connection means between the ends of the carrier, characterized in that the connection means comprises a vertical axle permitting the carrier to be rotated about a vertical axis and in that the carrier consists of at least two telescopically movable members, one of which is capable of being connected to the vehicle by said connection means and another of which is provided with said means for detachably attaching said implement for forestry cultivation, the members being interconnected by a device consisting of a hydraulic circuit including a hydraulic double-acting piston-cylinder means connected to the telescoping members, and an accumulator, the device exerting a force, the force being applied by fluid pressure, the force being operable to urge the telescopically movable members to telescopically contract the contracting force being adapted to urge the implement against a towing resistance toward said vehicle and said device being provided with a hydraulic pressure relief valve between supply and discharge conduits to the piston-cylinder means and set to a predetermined value so that when the towing resistance exceeds the predetermined value, the force urging the members to contract is overcome by said resistance, thus permitting relative movement between the telescopically movable members and permitting said force to retract the members when the towing resistance no longer exceeds the predetermined value, and the device further comprising a direction control valve for said piston-cylinder means, the relief valve being set at a pressure which is higher than the pressure for the direction control valve.

3. The apparatus of claim 2 wherein the connection means for connecting the carrier to the vehicle comprises a horizontal axle perpendicular to the longitudinal direction of the telescoping members.

4. The apparatus of claim 3 wherein a pair of additional piston-cylinder devices are provided for pivoting the members about said axles.

5. The apparatus of claim 4 wherein the vertical axle is adapted to be located forward of all of the rear wheels of the vehicle.

6. The apparatus of claim 5 wherein the member to which the implement may be attached is adapted to be movable relative to the vehicle in the longitudinal direction and is supported within the member adapted to be connected to the vehicle by means of support rollers, one of the support rollers being located at a rearward end of the member adapted to be connected to the vehicle.

7. The apparatus of claim 3 wherein the member to which the implement may be attached is adapted to be movable relative to the vehicle in the longitudinal direction and is supported within the member adapted to be connected to the vehicle by means of support rollers, one of the support rollers being located at a rearward end of the member adapted to be connected to the vehicle.

8. The apparatus of claim 2 wherein the vertical axle is adapted to be located forward of all of the rear wheels of the vehicle.

9. The apparatus of claim 2 wherein the member to which the implement may be attached is adapted to be movable relative to the vehicle in the longitudinal direction and is supported within the member adapted to be connected to the vehicle by means of support rollers one of the support rollers being located at a rearward end of the member adapted to be connected to the vehicle.

10. A vehicle and carrier combination comprising an articulated forestry vehicle and a carrier supported on said vehicle, one end of carrier being provided with means for detachably attaching an implement for forestry cultivation, and the carrier being connected to the vehicle at at least one connection means between the ends of the carrier, characterized in that the connection means comprises a vertical axle permitting the carrier to be rotated about a vertical axis and in that the carrier consists of at least two telescopically movable members, one of which is connected to the vehicle by said connection means and another of which is provided with the said means for detachably attaching said implement for forestry cultivation, the members being interconnected by a device consisting of a hydraulic circuit including a hydraulic double-acting piston-cylinder means connected to the telescoping members, and an accumulator, the device exerting a force, the force being applied by fluid pressure, the force being operable to urge the telescopically movable members to telescopically contract the contracting force being adapted to urge the implement against a towing resistance toward said vehicle and said device being provided with a hydraulic pressure relief valve between supply and discharge conduits to the piston-cylinder means and set to a predetermined value so that when the towing resistance exceeds the predetermined value, the force urging the members to contract is overcome by said resistance, thus permitting relative movement between the telescopically movable members and permitting said force to retract the members when the towing resistance no longer exceeds the predetermined value, and the device further comprising a direction control valve for said piston-cylinder means, the relief valve being set at a pressure which is higher than the pressure for the direction control valve.

11. The apparatus of claim 10 wherein the connection means for connecting the carrier to the vehicle comprises a horizontal axle perpendicular to the longitudinal direction of the telescoping members.

12. A carrier adapted to be supported on a vehicle, one end of the carrier being provided with means for detachably attaching an implement for forestry cultivation, and the carrier being capable of being connected to the vehicle at at least one connection means between the ends of the carrier, characterized in that the connection means comprises a vertical axis permitting the carrier to be rotated about a vertical axis and in that the carrier consists of at least two telescopically movable members, one of which is capable of being connected to the vehicle by said connection means and the other of which is provided with said means for detachably attaching said implement for forestry cultivation, the members being interconnected by a device exerting a force, the force being applied by fluid pressure, the force being operable to urge the telescopically movable members to telescopically contract the contracting force being adapted to urge the implement against a towing resistance toward said vehicle and said device being provided with a pressure relief valve set to a predetermined value so that when the towing resistance exceeds the predetermined value, the force urging the members to contract is overcome by said resistance, thus permitting relative movement between the telescopically movable members and permitting said force to retract the members when the towing resistance no longer exceeds the predetermined value, wherein the member to which the implement may be attached is adapted to be movable relative to the vehicle in the longitudinal direction and is supported within the member adapted to be connected to the vehicle by means of support rollers, one of the support rollers being located at a rearward end of the member adapted to be connected to the vehicle.

13. A vehicle and carrier combination comprising an articulated forestry vehicle and a carrier supported on said vehicle, one end of the carrier being provided with means for detachably attaching an implement for forestry cultivation, and the carrier being connected to the vehicle at at least one connection means between the ends of the carrier, characterized in that the connection means comprises a vertical axle permitting the carrier to be rotated about a vertical axis and in that the carrier consists of at least two telescopically movable members, one of which is connected to the vehicle by said connection means and another of which is provided with the said means for detachably attaching said implement for forestry cultivation, the members being interconnected by a device exerting a force, the force being applied by fluid pressure, the force being operable to urge the telescopically movable members to telescopically contract the contracting force being adapted to urge the implement against a towing resistance toward said vehicle and said device being provided with a pressure relief valve set to a predetermined value so that when the towing resistance exceeds the predetermined value, the force urging the members to contract is overcome by said resistance, thus permitting relative movement between the telescopically movable members and permitting said force to retract the members when the towing resistance no longer exceeds the predetermined value, wherein the member to which the implement may be attached is movable relative to the vehicle in the longitudinal direction and is supported within the member connected to the vehicle by means of support rollers, one of the support rollers being located at a rearward end of the member connected to the vehicle.

* * * * *